United States Patent [19]

Neko

[11] Patent Number: 4,787,834
[45] Date of Patent: Nov. 29, 1988

[54] METERING APPARATUS OF INJECTION MOLDING MACHINE

[75] Inventor: Noriaki Neko, Hachioji, Japan

[73] Assignee: Fanuc Ltd., Minamitsuru, Japan

[21] Appl. No.: 80,563

[22] PCT Filed: Nov. 19, 1986

[86] PCT No.: PCT/JP86/00594

§ 371 Date: Jul. 9, 1987

§ 102(e) Date: Jul. 9, 1987

[87] PCT Pub. No.: WO87/03244

PCT Pub. Date: Jun. 4, 1987

[30] Foreign Application Priority Data

Nov. 20, 1985 [JP] Japan .................. 60-258594

[51] Int. Cl.$^4$ ............................................. B29C 45/77
[52] U.S. Cl. .................................. 425/145; 264/401; 425/171
[58] Field of Search ............... 425/135, 149, 150, 558, 425/170, 559, 171, 561, 145, 586, 147, 149; 264/40.1

[56] References Cited

FOREIGN PATENT DOCUMENTS 52-43869 11/1977 Japan .
224324 12/1984 Japan .
174623  9/1985 Japan .
158417  7/1986 Japan .

*Primary Examiner*—Jay H. Woo
*Assistant Examiner*—Timothy W. Heitbrink
*Attorney, Agent, or Firm*—Staas & Halsey

[57] ABSTRACT

A metering apparatus which can perform accurate metering is provided in an injection molding machine having a screw rotating motor and an injection servo motor. A screw position (SP), based on an output supplied from a position detector is provided to the injection servo motor and is compared with a deceleration start position (SCBK-l), which is set slightly before a preset metering point (SCBK). When it is determined that the screw has reached the deceleration start position, the screw rotating motor is slowed down. Thereafter, when it is determined that the screw has reached the preset metering point, driving of the screw rotating motor is stopped.

2 Claims, 2 Drawing Sheets

METERING APPARATUS OF INJECTION MOLDING MACHINE

BACKGROUND OF THE INVENTION

The present invention relates to a metering apparatus of an injection molding machine and, more particularly, to a metering apparatus which is mounted on an injection molding machine using a motor as a drive source for rotating a screw and supplying a back pressure by a servo motor used as a drive source for an injection mechanism in metering, thereby correctly performing metering.

In a conventional injection molding machine, a screw is rotated by a motor, or the like, during metering, and a back pressure is applied by a hydraulic piston, or the like. The resin is melted by rotation of the screw. When the molten pressure of the resin exceeds the back pressure, the screw is moved backward. When the screw reaches a metering pin, it is detected by a limit switch, or the like, and the rotation of the screw is stopped. However, even when the screw has reached the metering point and the limit switch is operated, the rotation of the screw is not stopped immediately because of the inertia of the screw rotating mechanism. As a result, the metered injection amount may be excessive. When the actual metering point is set at a position slightly before a logical metering point, considering inertia, the injection amount may be insufficient. Also, because of the preset position error of the limit switch or the operation error, high-precision metering cannot be performed. The metering error causes short shot, a sink mark, or a burr, so that a product having a good quality cannot be obtained.

In order to solve the above problem, as is disclosed in Japanese patent publication No. 52-43869, the screw rotation speed is reduced at a position slightly before the metering point in order to decrease the inertia, and the screw is stopped at the metering point. However, in this method as well, the position of the screw is detected by a limit switch. Therefore, a metering error occurs because of the preset position error and the operation error of the limit switch. Since the error amount generated by the inertia of the screw rotating mechanism differs depending on the rotation speed of the screw, high-precision metering cannot be performed unless the preset position of the limit switch is moved every time the screw rotation speed is changed.

SUMMARY OF THE INVENTION

The present invention has been made in order to eliminate the above drawbacks of the conventional technique and has an object to provide a metering apparatus for an injection molding machine wherein a metering point can be easily set and which can perform metering correctly without being influenced by the inertia of the screw rotating mechanism, even when the preset screw rotation speed is changed in the last stage of the metering process.

In order to achieve the above object, according to the present invention, an injection molding machine is provided which rotates a screw by a screw rotating motor, and supplies a predetermined back pressure by an injection servo motor, for driving an injection mechanism for moving the screw in an axial direction during metering. The position of the screw is detected by a position detecting means based on a position detection output supplied from a position detector of the injection servo motor. Next, a screw position indicating a metering point at which metering is to be ended is stored in a memory means. The screw position detected by the position detecting means and a metering position stored in the memory means are then compared by a metering point detecting means, thereby discriminating whether the screw has reached the metering point. Further, the screw position, detected by the position detecting means, and a decelerating screw position, set at a position slightly before the metering pont, are compared by a screw deceleration point detecting means, thereby discriminating whether the screw has reached a deceleration start position. Finally, a rotation control means decreases the rotation speed of the screw rotating motor, in accordance with a detection output supplied from the screw deceleration point detecting means, and stops the driving of the screw rotating motor in accordance with a detection output supplied from the metering point detecting means.

As described above, according to the present invention, during metering the position of a screw, which is moved backward by the differential pressure between the molten resin pressure and the back pressure applied to the screw by the injection servo motor, is detected by the position detecting means. When the screw position reaches the decelerating position, slightly before the preset metering point, the screw rotation speed is decreased, and the screw is stopped at the preset metering point. Therefore, high-precision metering can be performed without being influenced by the inertia of the screw rotating mechanism. Since the position of the screw is detected by the position detecting means based on the position detection output supplied from the position detector and provided to the injection servo motor, a limit switch or the like is not used. As a result, correct metering can be performed without being influenced by the preset error or operation error of the limit switch or similar device. Since the metering point and the decelerating point can be easily changed, and the position of the deceleration point can also be easily changed, in accordance with the screw rotation speed in the final stage of metering, optimum metering can be performed.

DETAILED DESCRIPTION OF THE PREFERRED EMBODIMENTS

Figure 1:
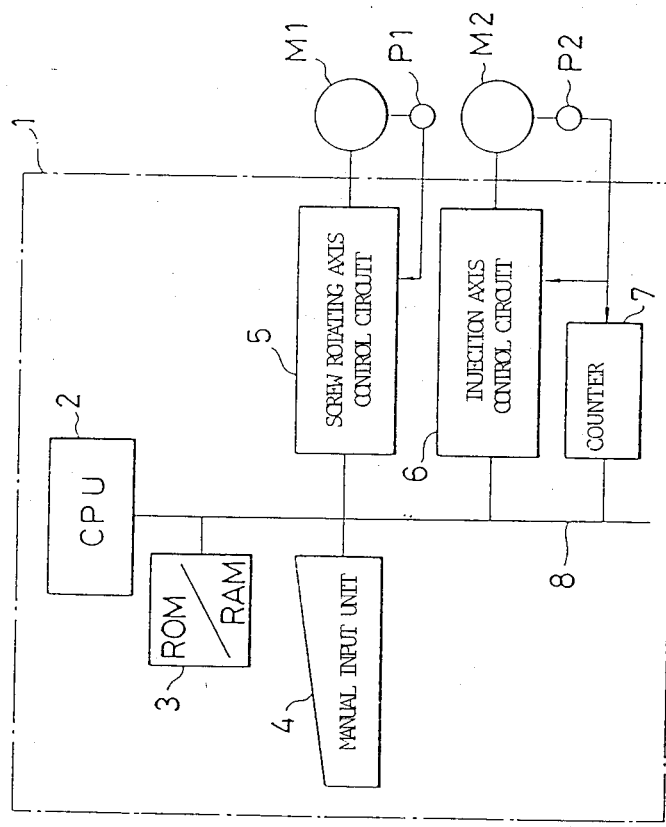
FIG. 1 is a block diagram of a metering apparatus control system for an injection molding machine according to an embodiment of the present invention.

FIG. 1 shows a control system of an injection molding machine incorporating a metering apparatus according to an embodiment of the present invention. Referring to FIG. 1, reference numeral 1 denotes a controller, such as a numerical controller, for controlling the injection molding machine. In the controller, reference numeral 2 denotes a microcomputer (to be referred to as a CPU hereinafter), and 3 is a memory.

The memory 3 includes a ROM, a RAM and a nonvolatile RAM. The ROM stores a control program for controlling the respective operations of metering, injection, die clamping and so on of the injection molding machine. The RAM is utilized for temporarily storing data. The nonvolatile RAM stores various preset values such as, the screw rotation speed of the respective stages of metering, to be described later; switching screw positions of the respective stages; a metering point indicating a metering end screw position, and a screw decelerating point, before the metering point, for decelerating the screw rotation; and so on.

The remaining reference numerals correspond to the following devices: 4 denotes a manual input unit for inputting the various preset values and various types of commands; 5 is a screw rotating axis control circuit, such as a servo circuit, for controlling a servo motor M1 for rotating a screw (not shown); 6 is an injection axis control circuit, such as a servo circuit, for controlling an injection servo motor M2, for driving the screw in the axial direction in order to perform injection, and for supplying a back pressure during metering; P1 and P2 are position detectors, such as pulse encoders, provided to the servo motors M1 and M2; 7 is a counter for performing counting up/down upon reception of pulses from the position detector P2, of the injection servo motor M2; and 8 is a bus.

The metering operation of the injection molding machine of this invention will now be described.

Figure 2:
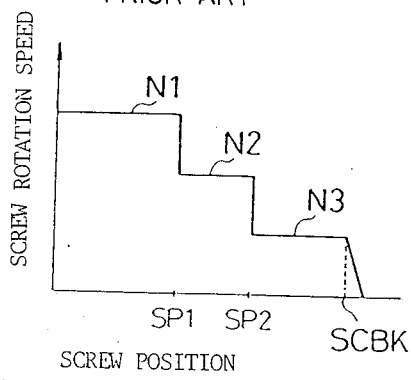
FIG. 2 is a graph illustrating the metering operation of a conventional injection molding machine.

Referring to FIG. 2, a metering operation of a conventional example, wherein the screw rotation speed during metering is switched in three stages, will now be described. Assuming that metering is started and the screw is rotated at the preset speed N1. When the screw position is moved backward to position SP1, the screw rotation speed is switched to the rotation speed N2 for the second stage. Then, when the screw position is moved backward to position SP2, the rotation speed is changed to N3 for the final stage. When the screw is moved backward to a preset metering point SCBK position, the motor for screw rotation is stopped, and metering is ended.

However in the conventional metering system, even when the motor for screw rotation is stopped, the screw continues rotation by the inertia of the screw rotation transmitting mechanism, or the like, as shown in FIG. 2. As a result, the screw continues to move backward, stops at a backward position exceeding the preset metering point SCBK, and the metered injection amount becomes excessive. Even when the preset metering point SCBK is set considering the inertia, the inertia varies every time the preset value of the variable screw rotation speed is changed, and the backward movement amount of the screw is changed. Since the inertia differs depending on the injection molding machine, high-precision metering cannot be performed without considerable inconvenience, as the inertia of each injection machine must be determined for each preset value of the variable screw rotation speed.

Figure 3:
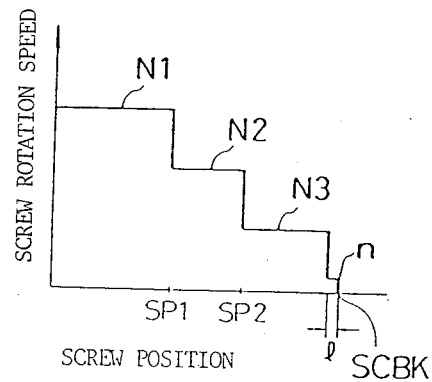
FIG. 3 is a graph illustrating the metering operation of the apparatus shown in FIG. 1.

Therefore, in the present invention as shown in FIG. 3, the screw rotation speed is decreased from a time point when the screw has reached the screw backward position prior to the preset metering point SCBK by a distance l, in the final stage. The screw rotation speed sufficiently decreases the inertia of the screw rotating mechanism, so that the influence of the inertia on the metering precision can be substantially eliminated, thereby allowing high-precision metering to be performed.

Figure 4:
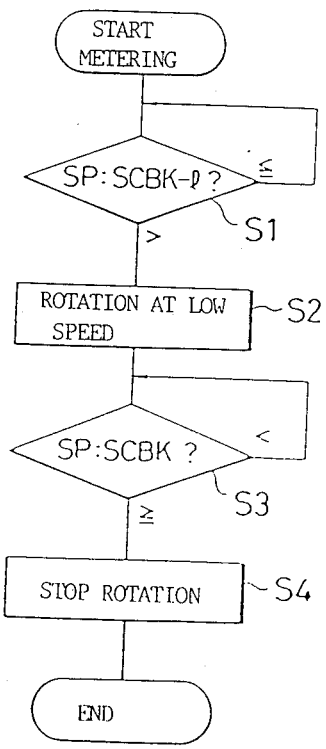
FIG. 4 is an operation processing flow chart of the metering apparatus of the present invention.

Referring to FIGS. 1 and 4, when metering is started for an injection molding machine, the CPU 2 reads a screw rotation speed N1 for the first stage, which is set in the memory 3, and drives the servo motor M1 via the screw rotating axis control circuit 5, in order to rotate the screw at the rotation speed N1. As a result, the screw is moved backward, and a pulse is supplied from the position detector P2 of the injection servo motor M2 to be counted by the counter 7, in order to detect a screw backward position SP. Thereafter, when the screw position SP has reached the switching point SP1, at which point the second stage is to begin (as is stored in the memory 3), a screw rotation speed N2 of the second stage is read out from the memory 3, and the screw is rotated at this speed. The metering operation is continued in a similar manner. When the final stage of the metering operation has been reached, in step S1 of FIG. 4 the CPU 2 determines whether the screw position SP has reached a screw decelerating start position SCBK-l (l indicates the distance of the deceleration section), which is set slightly prior to the metering point SCBK. The screw decelerating start position SCBK-l is stored in the memory 3.

It is preferable that the screw position for starting deceleration of the screw rotation be variable, so as to correspond to the type of the injection molding machine. In this case, for example, a screw position deviated by a predetermined distance l in the screw forward direction, with respect to the metering point SCBK, can be set in the program as the corresponding deceleration start position. When an injection molding machine is used which can largely change the screw rotation speed (N3) of the final stage, the deceleration distance l may also be set by the operator through the manual input unit 4 and stored in the memory 3. The distance l may be read out in step S2, the distance l may then be subtracted from a preset metering point SCBK, and the subtracted result may be compared with the screw position SP.

Subsequently, when the screw position SP has reached the deceleration start position (SCBK-l) of the screw rotation, the CPU 2 drives the screw at a slow speed n (step S2), and determines whether the screw position SP has reached the metering point SCBK (step S3). When the screw position SP has reached the metering point, the rotation of the screw is stopped (step S4), and the metering processing is ended.

Although certain embodiments have been shown and described, it should be understood that many changes and modification may be made without departing from the scope of the appended claims.

What is claimed is:

1. A metering apparatus of an injection molding machine which includes a screw, a screw rotating motor for rotating the screw, an injection mechanism for moving said screw in an axial direction during metering, and an injection servo motor for driving said injection mechanism, said metering apparatus comprising:
    means for detecting a position of said screw;
    memory means for storing a screw completion position indicating a metering point at which metering is to be completed;
    metering point detecting means for comparing the detected screw position and the screw completion position stored in said memory means for determining whether the screw has reached the metering point;
    screw deceleration point detecting means for comparing the detected screw position and a decelerating screw position, the decelerating screw position being set at a position slightly prior to the metering point, and for determining whether said screw has reached a screw deceleration position; and rotation control means for decreasing rotation speed of said screw rotating motor when said screw deceleration point detecting means indicates that said screw has reached the decelerating screw position and for stopping said screw rotating motor at the metering point as prescribed by said metering point detecting means.

2. An apparatus according to claim 1, wherein a predetermined deceleration distance is stored in said memory means, and said screw deceleration detecting means discriminates whether the screw has reached the screw deceleration position by subtracting the stored deceleration distance from the metering point and comparing the result with the detected screw position.

* * * * *